United States Patent
Beutler et al.

(10) Patent No.: US 9,664,770 B2
(45) Date of Patent: May 30, 2017

(54) METHOD AND SYSTEM FOR SIMULTANEOUS RECEIVER CALIBRATION AND OBJECT LOCALISATION FOR MULTILATERATION

(71) Applicants: Karlsruher Institut Fuer Technologie, Karlsruhe (DE); COMSOFT GmbH, Karlsruhe (DE)

(72) Inventors: Frederik Beutler, Karlsruhe (DE); Uwe D. Hanebeck, Waldbronn (DE); Mike Leeson, Karlsruhe (DE)

(73) Assignee: Comsoft Solutions GmbH, Karlsruhe (DE)

( * ) Notice: Subject to any disclaimer, the term of this patent is extended or adjusted under 35 U.S.C. 154(b) by 430 days.

(21) Appl. No.: 14/465,212

(22) Filed: Aug. 21, 2014

(65) Prior Publication Data
US 2014/0368387 A1    Dec. 18, 2014

Related U.S. Application Data

(63) Continuation of application No. PCT/EP2013/053332, filed on Feb. 20, 2013.

(30) Foreign Application Priority Data

Feb. 21, 2012   (EP) ..................... 12156317

(51) Int. Cl.
    *G01S 3/02*       (2006.01)
    *G01S 1/08*       (2006.01)
    (Continued)

(52) U.S. Cl.
    CPC .............. *G01S 1/08* (2013.01); *G01S 5/0278* (2013.01); *G01S 5/06* (2013.01)

(58) Field of Classification Search
    CPC ............ G01S 3/02; G01S 1/08; G01S 5/0278; G01S 5/06
    (Continued)

(56) References Cited

U.S. PATENT DOCUMENTS

| | | | |
|---|---|---|---|
| 2004/0072582 A1 | 4/2004 | Aljadeff et al. | |
| 2011/0176483 A1* | 7/2011 | Palanki | H04W 56/0015 370/328 |

OTHER PUBLICATIONS

Kaune, Jul. 5-8, 2011,14th International Conference on Information Fusion Chicago, Illinois, USA, 1-8.*
(Continued)

*Primary Examiner* — Harry Liu
(74) *Attorney, Agent, or Firm* — Jeffrey B. Powers; Bond Schoeneck & King, PLLC

(57) ABSTRACT

An apparatus for multilateration of a plurality of P objects, each having a transmitter device, and each transmitter device transmitting a signal, the apparatus including N sensors, a processing unit, each sensor receiving the transmitted signals and determining receive times of each signal. The processing unit performing steps: A. combining receive times for signals into a chronologically ordered series of message sets, wherein each message sets comprises the receive times of one of the transmitted signals, B. collecting all valid message sets that occur within a predetermined time interval, wherein k denotes a time step, and wherein each valid message set contains receive times from at least N sensors, C. estimating a time offset vector $O_k$ comprising time offsets $O_k^i$ of the receive times of the N sensors at step k and i=1 to N by processing message sets, and D. outputting a position of the objects.

15 Claims, 5 Drawing Sheets

(51) Int. Cl.
G01S 5/02 (2010.01)
G01S 5/06 (2006.01)

(58) Field of Classification Search
USPC .......................................................... 342/463
See application file for complete search history.

(56) References Cited

OTHER PUBLICATIONS

J.O. Smith and J. S. Abel, "Closed-Form Least-Squares Source Location Estimation from Range-Difference Measurements," IEEE Transactions of Acoustics, Speech, and Signal Processing, vol. ASSP-35, No. 12, pp. 1661-1669, Dec. 1987.

Y. Chan and K. Ho, "A Simple and Efficient Estimator for Hyperbolic Location," IEEE Transactions on Signal Processing, vol. 42, No. 8, pp. 1905-1915, Aug. 1994.

F. Fletcher, B. Ristic, and D. Musicki, "Recursive Estimation of Emitter Location using TDOA Measurements from two UAVs," in Proceedings of the 10th International Conference on Information Fusion (Fusion 2007), Quebec, Canada, Jul. 2007, pp. 1-8.

S. Bancroft, "An Algebraic Solution of the GPS Equations," IEEE Transactions on Aerospace and Electronic Systems, vol. AES-21, No. 1, pp. 56-59, Jan. 1985.

F. Beutler and U. D. Hanebeck, "A Two-Step Approach for Offset and Position Estimation from Pseudo-Ranges Applied to Multilateration Tracking," in Proceedings of the 13th International Conference on Information Fusion (Fusion 2010), Edinburgh, United Kingdom, Jul. 2010, pp. 1-8.

P. Dunau, F. Packi, F. Beutler, and U. D. Hanebeck, "Efficient Mul¬ command tilateration Tracking System with Concurrent Offset Estimation using Stochastic Filtering Techniques," in Proceedings of the 13th Interna¬ tional Conference on Information Fusion (Fusion 2010), Edinburgh, United Kingdom, Jul. 2010, pp. 1-8.

G. Welch, B. D. Allen, A. Ilie, and G. Bishop, "Measurement Sample Time Optimization for Human Motion Tracking/Capture Systems," in Proceedings of Trends and Issues in Tracking for Virtual Environments, Workshop at the IEEE Virtual Reality 2007 Conference, Charlotte, North Carolina, Mar. 2007.

Y. Bar-Shalom, X. R. Li, and T. Kirubarajan, Estimation with Applications to Tracking and Navigation: Theory, Algorithms and Software. John Wiley & Sons, Inc., 2001, pp. 269-270.

K. Ito and K. Xiong, "Gaussian Filters for Nonlinear Filtering Problems," IEEE Transactions on Automatic Control, vol. 45, No. 5, pp. 910-927, May 2000.

F. Beutler, M. F. Huber, and U. D. Hanebeck, "Gaussian Filtering using State Decomposition Methods," in Proceedings of the 12th International Conference on Information Fusion (Fusion 2009), Seattle, Washington, Jul. 2009, pp. 1-8.

J. Isaacs, D. Klein, and J. Hespanha, "Optimal Sensor Placement for Time Difference of Arrival Localization," in Proceedings of the 48th IEEE Conference on Decision and Control, 2009 held jointly with the 2009 28th Chinese Control Conference (CDC/CCC 2009), Shanghai, China, Dec. 2009, pp. 7878-7884.

* cited by examiner

METHOD AND SYSTEM FOR SIMULTANEOUS RECEIVER CALIBRATION AND OBJECT LOCALISATION FOR MULTILATERATION

CROSS-REFERENCE TO RELATED APPLICATIONS

This application is filed under 35 U.S.C. §120 and §365(c) as a continuation of PCT International Patent Application No. PCT/EP2013/053332 filed Feb. 20, 2013 which application claims priority from European Patent Application No. 12156317.5 filed Feb. 21, 2012, which applications are incorporated herein by reference in their entireties.

FIELD OF THE INVENTION

The present invention relates to a method and system for multilateration, and in particular to a method and system for multilateration, preferably wide-area multilateration, wherein object localisation and receiver calibration are performed.

BACKGROUND OF THE INVENTION

Multilateration is a method for tracking objects, i.e., for retrieving reliable information about the state of one or more objects. The state might comprise the position and/or the velocity of the objects, but is not restricted to these quantities. In general, the state can comprise all information about the object that is considered necessary, for example, the acceleration of the objects. There is a wide range of applications for multilateration methods. Particularly relevant are wide-area multilateration (WAM) methods employed in civil or military air surveillance, i.e., for tracking the positions, velocities, etc. of aircraft or other objects like, e.g., helicopters, unmanned aerial vehicles, or satellites. Another example for multilateration is the localisation of a cell phone in case of an emergency call. Multilateration methods can also be used for automotive applications based on retrieving information about the objects in the environment of a car, for example, to increase the security or the driving comfort.

The basic principle of multilateration is to receive signals transmitted by one or more objects to be tracked at several receivers, in the following also designated as sensors, located at different receiver sites, in the following also designated as sensor positions, and to make use of the different receiving times of each of the signals measured at the different receiver sites. To that end, a multilateration system comprises at least a number of receivers and a processing unit configured to process the receiving times of a signal measured at each of the receivers and to output an estimated set of information comprising, e.g., the respective positions of the one or more objects.

Various assemblies and methods can be deployed for surveillance. For example, primary or secondary radar can be used. Primary radar uses the reflection of a signal at the surface of an object. Thus, it can be used in order to localise "uncooperative" objects that are not autonomously emitting signals and/or do not answer requests solicited by the multilateration system. In a secondary radar system, signals transmitted from the multilateration system by means of an "interrogator" are answered by a transponder of an object. Such a system is also called an "active system". In contrast to this, a "passive system" makes use of signals autonomously transmitted by an object or solicited by other equipment. Furthermore, it can be distinguished between deterministic and stochastic multilateration methods.

A rather straightforward technique for finding the position of an object by means of the above described equipment is a deterministic method as follows.

A relation between an object's position emitting a signal and the receiving times of the signal at each of the receivers is given by a set of N equations $$y^i = \frac{\|\underline{x} - \underline{S}^i\|}{c} + t_e (i \in \{1, \ldots, N\}), \quad (1)$$

with $\underline{x}$ denoting the position of the object and $\underline{S}^i$ denoting the position of the i'th receiver, N labelling the number of receivers, c denoting the propagation velocity of the medium (ca. $3 \times 10^8$ m/s in air), $t_e$ labelling the emission time of the signal, $y^i$ being the measured receiving times at the i'th receiver, and $\|\cdot\|$ denoting the Euclidean norm or $L_2$ norm in space. Usually, the dimension D of the space, and thus, also the dimension of the vectors $\underline{x}$ and $\underline{S}^i$, is 2 or 3. In order to remove the unknown emission time $t_e$, the equation set (1) is transformed into another equation set comprising the time differences of arrival (TDOA) instead of the measured receiving times. Therefore, without loss of generality a reference receiver, for example the receiver at $\underline{S}^1$, may be chosen and the measured receiving times of each of the other receivers may be subtracted from the measured receiving time at $\underline{S}^1$. The result is a set of (N−1) equations, each of which describing a hyperboloid in space. The position of the object is then given by the intersection of these hyperboloids. For the 2-dimensional case, it follows that at least N=3 receivers are required for a unique determination of an object's position. Then, the position of the object is given by the intersection of 2 hyperbolas. In the 3-dimensional case, 4 receivers are necessary to locate the object at the intersection point of 3 hyperboloids. Additional receivers can be used to improve the accuracy of the result.

As the described method is a purely deterministic model, it ignores that measurements in real world are superimposed with noise. To address this issue, estimation methods have to be employed that allow for an explicit consideration of noise or measurement errors within the calculation. The issue has been discussed, for example, in Ref [1], where an "equation error" is introduced and a least-square procedure is used for an estimation of the position of an object. Under certain assumptions, the algorithm proposed in Ref [1] can be considered as a maximum-likelihood estimator. A further development is the maximum-likelihood estimator proposed in Ref [2], where additionally an intermediate variable is used. This leads to a hyperspace solution.

Furthermore, variants of the Kálmán filter proved to be especially suitable to address the problem of tracking objects. The Kálmán filter allows for an estimation of a system's state in real time, even in those cases where only information from inaccurate observations is available. When using Kálmán filters, it is prerequisite that the dynamics of the system state is described separately from the measurement process. This is normally done by (i) a system equation describing the time evolution of the system state and (ii) a measurement equation coupling the system state with the measurements. Usually, both of the equations comprise a deterministic and a stochastic part. This way, it is not only possible to describe noisy observations, but also to deal with uncertainties in modelling the dynamic behaviour of the state [10].

In a time-discretised approach, system equation and measurement equation can then be written in the form:

$$\underline{z}_{k+1} = \underline{a}(\underline{z}_k, \underline{w}_k), \quad (2)$$

$$\underline{y}_k = \underline{h}(\underline{z}_k, \underline{v}_k), \quad (3)$$

wherein the function $\underline{a}$ recursively describes the time evolution of the system state $\underline{z}_k$ by propagating it from a given time step k to the next time step (k+1), and the function $\underline{h}$ establishes for any time step k a relation for the system state $\underline{z}_k$ and the measurement $\underline{y}_k$. Further, $\underline{w}_k$ and $\underline{v}_k$ are random variables describing uncertainties of the time evolution model of Eq. (2) or noise during the measurement process described by Eq. (3). Then, due to the stochastic nature of the Equations (2) and (3), also the state $\underline{z}_k$ and the measurement $\underline{y}_k$ are random variables. The time propagation of a probability distribution of the state $\underline{z}_k$ can then be described by a two-step procedure comprising a prediction step and a filter step. Be $f^e(\underline{z}_k)$ an estimated distribution of $\underline{z}_k$ at time step k. Then, in a first step, a prediction for the distribution $f^p(\underline{z}_k)$ of the state $\underline{z}_k$ at time step (k+1) is given by the Chapman-Kolmogorov equation $$f^p(\underline{z}_{k+1}) = \int f(\underline{z}_{k+1}|\underline{z}_k) \cdot f^e(\underline{z}_k) d\underline{z}_k, \quad (4)$$

wherein the transition density $f(\underline{z}_{k+1}|\underline{z}_k)$ is defined by Eq. (2). In the second step, the current measurement $\hat{\underline{y}}_k$ is used to filter the result of Eq. (4) according to Bayes' rule $$f^e(\underline{z}_k) = c_k \cdot f(\hat{\underline{y}}_k|\underline{z}_k) \cdot f^p(\underline{z}_k), \quad (5)$$

where $c_k = 1/(\int f(\hat{\underline{y}}_k|\underline{z}_k) \cdot f^p(\underline{z}_k) \cdot d\underline{z}_k)$ is a normalization constant and $f(\hat{\underline{y}}_k|\underline{z}_k)$ is the likelihood defined by Eq. (3).

Under the conditions that Equations (2) and (3) both are linear and that the state is normally distributed, the density $f^p$ predicted in Eq. (2) as well as the estimated density $f^e$ of the filter step in Eq. (5) can be derived exactly within the Kálmán framework that yields the first two moments, i.e., expectation value and covariance, of these distributions. As under said conditions both densities stay normally distributed for all time steps, the densities are completely described therewith.

However, the Kálmán filter method described above is restricted to purely linear models. As multilateration methods are in general based on non-linear measurement equations, the original formulation of the Kálmán filter cannot be applied. However, variants such as the extended Kálmán filter (EKF) or the unscented Kálmán filter (UKF) are available that provide approximations in case of non-linear equations. An analysis of the performance of these filters in the context of multilateration is given in Ref. [3], which also addresses the recent trend "towards the use of a number of lower cost, low fidelity sensors" [3]. The EKF has been derived from the original Kálmán filter by means of a successive linearization of the process [9]. On the other hand, the UKF or the so-called Gaussian filters are examples of sample-based linear regression Kálmán filters (LRKFs) [10]. Several types of Gaussian filters have been discussed in detail in Ref [9], and it has been shown that these filters are numerically superior over the EKF without causing additional numerical costs. In some cases, for example if the considered equations can be separated into a linear and a nonlinear substructure or if the state vector comprises a directly observed and an indirectly observed part, only part of the filtering process has to be treated in an approximate fashion, when appropriate decomposition methods are used as, for example, proposed in Ref. [10] for the class of Gaussian filters.

Attention should be paid to the fact that all multilateration methods mentioned so far, i.e., the deterministic method of Eq. (1) as well as the stochastic methods described in Refs. [1-3], do not work on the raw data obtained from the measured receiving times, but on the TDOA (time difference of arrival) measurements. This implies that these methods are ultimately based on finding the intersection point of a number of hyperboloids. As mentioned above, the reason for this is to eliminate the unknown emission time of the signals from the description. However, intersecting hyperboloids "is considered a hard task" [6]. Therefore, in Refs. [5] and [6] a multilateration method is developed that allows to reduce the problem to finding the intersection of cones, which is numerically much easier to handle. The emission time b of a signal is thereby estimated. In Ref. [5], the estimation is performed by minimising the Mahalanobis distance M(b) with respect to b.

As already outlined above, closed-form solutions as proposed in Refs. [1,2] or state estimators as disclosed in Ref. [3] can be used, when the arrival times are converted to time difference of arrival. On the other hand, if the arrival times are processed directly, the problem is equal to the GPS problem and the closed-form solution of Ref [4] can be used. Further approaches that process arrival times directly by using a state estimator can be found in Ref [5] or [6] (see above), where in the latter one a system model describes the evolution of the emission time over time. Note, that in Ref. [5], no system model is used to describe the emission time. The emission time is determined by using a certain distance measure in a separate step.

A drawback of state of the art multilateration methods and systems is that all sensors of the multilateration system need to be accurately synchronized, so that the measured receiving times can be performed with a sufficiently high precision. Thus, it is required that all sensors have the same time base so that clock offsets of each of the sensor clocks are eliminated. This synchronization requires high effort and is usually performed by means of additional reference transponders or atomic clocks. The process for determining clock offsets, so that all sensor clocks are synchronized, is called calibration.

BRIEF SUMMARY OF THE INVENTION

The object of the present invention is to provide a method and a system for multilateration, wherein no synchronisation of the sensor clocks is required.

This object is achieved by a method and a system with the features of the claims.

In multilateration, preferably wide-area multilateration (WAM), signals emitted from several objects, e.g. aircraft, are received at different sensors. According to the measured receiving times, the positions of the objects are estimated. The present invention performs clock calibration and localization simultaneously, i.e., no explicit calibration of the sensors is required. Furthermore, the present invention directly operates on the measured receiving time. No conversion to time differences of arrival (TDOA) is necessary. This is achieved by modelling the emission times of the signal as a fully correlated noise process.

The present invention relies on that the signals of a plurality of objects, for example several aircraft and preferably signals representing aircraft motions serve for synchronization part and the estimated sensor offset for the localization part. The requirements for the algorithm are that at least one of several aircraft has to be localized in order to solve the synchronization problem. The transmitted signals of several aircraft (at unknown positions) are used, where the number of necessary aircraft for performing the calculations can be determined by comparing the number of unknowns (the number of aircraft times their degrees of freedom plus the number of unknown aircraft offsets plus the number of unknown sensor offsets) versus the number of given measurements (the length of the below further specified measurement vector).

The advantage of the invention is that it allows the use of many inexpensive unsynchronized sensors, compared to using a few sensors that are accurately synchronized, e.g., with atomic clocks. Furthermore, no synchronization to a global clock is needed and the time delay in the transmission, e.g., from antennas to sensors, is taken into consideration. The wording "unsynchronized sensors" means that the clocks associated with each of sensors, in the following also referred to as "sensor clocks", are not required to be synchronized to each other. In fact, the inherent time of each of the sensor clocks might be completely arbitrary, except for the requirement that the inherent time of each of the sensor clocks must not comprise discontinuities.

The new approach according to the invention is based on the concept that a certain number of objects can be localized in order to calibrate the network and that a series of additional measurements can be processed chronologically in the estimator. The present invention is particularly suitable for passive systems, see above.

According to the invention, it is required that a transmitted signal can be uniquely related to an object to be tracked by the multilateration system. For processing the transmitted signal, only its measured receiving time at the sensors is used. However, a transmitted signal may also comprise additional information such as, for example, the object's position according to WGS84, the barometric height, and the like.

For the method according to the invention, the following assumptions are made:

A transmitted signal, which is considered as a single event in time, can be detected at different sensors at different receiving times.

Each sensor can form a message which contains the receiving time of each transmitted signal and sufficient information to uniquely identify the transmitting object and the specific event in time.

The sensor messages relating to a single transmission event can be combined in a message set which contains the receiving times measured from the sensors.

Furthermore, the message sets are processed in a chronological way, so that the sensor offset can be estimated.

In other words a transmitter device of an object generates a respective signal. A sensor detects the signal and creates a message. The processing unit collects messages and creates a message set. The algorithm processes the message set. The message set depends on one respective object. Thus, a message set stems from one signal emitted by the object and received by several sensors. The measurement vector is the collection of several message sets from different objects and its arrangement in a vector. Thus, the measurement vector depends on all available objects.

In the method according to the present invention, the emission time is modelled as a fully correlated measurement noise, where no explicit system model is assumed. The emission time can be calculated in a similar way as in Ref [5].

One aspect of the invention is related to a method for multilateration of at least one of a plurality of P objects. The method uses a plurality of N sensors; a processing unit; a transmitter device in each of the objects, wherein each of the transmitters is configured to transmit a respective signal. The method comprises the following steps: (i) transmitting signals by the transmitter device of each of the objects; (ii) receiving the transmitted signals from each of the objects and measuring the respective receiving times by each of the sensors; (iii) combining the measured receiving times of the received signals into a chronologically ordered series of message sets, wherein each of the message sets comprises the receiving times of a single transmitted signal; (iv) collecting all valid message sets $\underline{y}_k$ that occur within a predetermined time interval $\Delta T_k$, wherein the index $k \in \{1, \ldots, N_{\Delta T}\}$ denotes a time step, and wherein a message set is valid, when it contains at least two measured receiving times; (v) processing at least two of chronologically obtained message sets by means of said processing unit performing an estimation process, wherein during the estimation process a time offset vector $\underline{o}_k$ is estimated, wherein $\underline{o}_k$ comprises the time offsets $o_k^i$ of the measurements of each of the N sensors at time step k and $i \in \{1, \ldots, N\}$; and (vi) outputting the position of said at least one of a plurality of objects.

In other words, the combination of the measured time events according to the above aspect is performed as follows:

Received measurement times are asynchronously recorded at the individual sensors and transmitted to a central processing unit. Received measurement times from different sensors that relate to the same transmitted signal are used to form a message set; a valid message set contains received measurement times from at least two sensors. The above stated step (iii) corresponds to grouping the valid message sets into bins of length $\Delta T_k$ and creating a measurement vector. This is a means for assembling required measurement vectors from the individual measurements. These measurement vectors now contain receiving times from several objects to several sensors, which are used for solving the simultaneous calibration problem in subsequent processing steps. In addition to this grouping process, the measurement vectors are sorted with respect to the receiving times in order to avoid complicated methods for including out-of-sequence measurement information into the estimation process.

In the formulas below starting with Eq. (6) grouping can be seen as follows. The individual receiving times for one object and one sensor is given in Eq. (6) and in more detail in Eq. (13) with the nonlinear distance functional from Eq. (10). The measurement vector in Eq. (24) is the one resulting from grouping and contains several individual receiving times.

Specific grouping time intervals for typical sensor setups used in the aerospace context are given hereunder.

The term "chronologically obtained" means that the corresponding message sets are sorted in time.

To illustrate the mentioned use of two consecutive measurement sets: For solely calculating the object positions and the sensor time offsets, processing a single message (of sufficient length) is sufficient. When, in addition, the velocities of the objects and the drift of the sensor clocks are desired, two consecutive measurement sets are used for performing the required calculations.

According to one aspect of the invention, the estimation process of the method comprises: a prediction step that is performed according to the Chapman-Kolmogorov equation; and a filter step that is performed using Bayes' rule.

According to one aspect of the invention, the method further comprises a step, wherein an emission time vector $\underline{b}_k$ is modelled as a full correlated noise process and/or is estimated, preferably by using a distance expression depending on an expectation value of $\underline{b}_k$, wherein $\underline{b}_k$ comprises the emission times $b_k^j$ of each of the P objects at time step k, wherein $j \in \{1, \ldots, P\}$.

According to one aspect of the invention, the filter step is performed in accordance with a measurement equation $$\underline{y}_k = \underline{h}(\underline{x}_k, \underline{S}, \underline{b}_k, \underline{o}_k, \underline{v}_k),$$

that, for any time step k, describes a relation between a measurement $\underline{y}_k$, and wherein $\underline{h}$ is a function depending on: an object position vector $\underline{x}_k$ at a time step k, comprising the positions $\underline{x}_k^j$ of each of the P objects at time step k, wherein $j \in \{1, \ldots, P\}$; a sensor position vector $\underline{S}$ comprising the positions $\underline{S}^i$ of each of the N sensors, wherein $i \in \{1, \ldots, N\}$; the time offset vector $\underline{o}_k$; a general noise vector $\underline{v}_k$ comprising general noises $v_k^{i,j}$ at time step k, wherein $i \in \{1, \ldots, N\}$ and $j \in \{1, \ldots, P\}$; and possibly the emission time vector $\underline{b}_k$ (i.e., the expression defining the function $\underline{h}$ might or might not explicitly depend on the emission time vector $\underline{b}_k$).

According to one aspect of the invention, the measurement equation is given by $$\underline{y}_k = \underline{h}(\underline{x}_k^1, \ldots, \underline{x}_k^P) + H^b \cdot \underline{b}_k + H^o \cdot \underline{o}_k + \underline{v}_k$$

with $$H^b = I_P \otimes \underline{1}_N, \quad H^o = \underline{1}_P \otimes I_N.$$

According to one aspect of the invention, the prediction step is performed in accordance with a model for describing the time evolution of a state. In this model for describing the time evolution of a state, the time is described by a series of discrete time steps $k \in \{1, \ldots, N_{\Delta T}\}$. For each of the time steps $k \in \{1, \ldots, N_{\Delta T}\}$, the state is thereby given by a vector $\underline{z}_k$ comprising: the object position vector $\underline{x}_k$; an object velocity vector $\underline{\dot{x}}_k$ comprising the velocity of each of the objects; the sensor offset vector $\underline{o}_k$; a sensor drift vector $\underline{\dot{o}}_k$ comprising the drift of each of the sensor offsets. Further, the model comprises a recursive system equation $$\underline{z}_{k+1} = \underline{a}(\underline{z}_k, \underline{w}_k),$$

wherein a is a function depending on the state at time step k and $\underline{w}_k$ denotes a noise process over the time steps $k \in \{1, \ldots, N_{\Delta T}\}$.

According to one aspect of the invention, the function a is an affine function, preferably a linear function, of the state $\underline{z}_k$ and the noise $\underline{w}_k$.

According to one aspect of the invention, the noise process $\underline{w}_k$ over the time steps $k \in \{1, \ldots, N_{\Delta T}\}$ is modelled as a Gaussian distributed process.

According to one aspect of the invention, the prediction step is performed using the Kálmán predictor equations.

According to one aspect of the invention, it is assumed that the measurement and the state are jointly Gaussian distributed, and that the estimated density is described by an expectation value and a covariance.

According to one aspect of the invention, the dependency for the component of the height is reduced by applying a rotation operator on the coordinates of the sensor positions.

According to one aspect of the invention, the dynamics in the measurement values for the j'th object is reduced by subtracting the minimal value of the message set from each of the components of the measurement vector $\underline{y}_k$, and by adding, to the result thereof, the expected distance of the j'th object.

According to one aspect of the invention, the number P of the objects is between 2 and 10, preferably between 3 and 5, and most preferably P=4; and/or the number N of the sensors is between 5 and 15, preferably between 6 and 10, and most preferably N=7.

According to one aspect of the invention, the length of each of the grouping time intervals $\Delta T_k$ with $k \in \{1, \ldots, N_{\Delta T}\}$ is between 0.01 and 10 s, preferably between 0.1 and 5 s, and most preferably is equal to 0.5 s.

One aspect of the invention is related to a system for multilateration of at least one of a plurality of P objects. The system uses a plurality of N sensors and a transmitter device in each of the objects, wherein each of the transmitters is configured to transmit a respective message signal. The system further comprises a processing unit configured to preferably operate according to a method according to one of the aspects as described above.

The basic concept of the present invention can be summarized as follows:

The solution of the problem of localizing a set of objects (aircraft) transmitting signals at unknown transmission times is based on receiving times in a set of sensors (base stations), where the sensors are not synchronized with respect to each other and with respect to the objects.

The invention allows calibrating the sensors, which is equivalent to determining a set of offsets relating the true time to the time base used in the sensors. No assumptions about the size of these offsets are made, so the offsets can be arbitrarily large and unbounded.

In this method the effective offsets disturbing the system are determined as they influence the localization procedure. This includes the timing errors themselves, but also signal run times in the receivers, certain propagation and processing delays and so forth. As a result, the effective offsets are not easily measurable, if at all.

The first challenge is how to perform the sensor time offset calibration without changing the hardware setup of the localization system and without using additional, outside information.

According to the present invention the objects, e.g., aircraft, are themselves used for performing the calibration. This has not been done before the present invention was made and was not apparent for several reasons. First, the object positions are unknown and can only be calculated once the sensor offsets are given. So, the objects cannot simply be used as reference beacons. Second, by including the objects into the calibration process for the sensor time offsets, more unknown variables are introduced, which include three unknowns for every aircraft position and a further unknown for the additional transmission offset in every object.

Hence, using the objects themselves for calibration results in two more challenges. The second challenge is that every object introduces new unknowns into the calibration process. Instead of solving the calibration process, this makes the (initial) problem harder.

The present invention provides a solution of this problem. Under certain circumstances, but that there are only a few object/sensor-configurations, it is possible to estimate the sensor offsets given the receiving times. A unique solution can be given if the condition $N \cdot P \geq N + P \cdot (D+1)$ is fulfilled. In all other circumstances, the desired variables cannot be obtained. For example, five sensors (base stations) require at least 5 objects (aircraft) for the estimation problem to be fully solved.

The third challenge resulting from using the objects themselves for calibration is that calibration now relies on received signals, for which both the transmission times (in the object) and the receiving times (in the sensor) are unknown. The two corresponding offsets always occur additively and cannot be separated.

The present patent application discloses an appropriate estimation structure to allow for the calculation of the desired offsets. For that purpose, the unknown sensor time offsets, according to the invention, are treated as time-varying quantities modelled as state variables with explicit models for their respective time evolution, see Eqs. (18) to (23).

This set of unknown sensor time offsets is then explicitly estimated simultaneously to the main state, i.e., the object positions, and to the first set of unknown offsets (corresponding to the object transmission offsets in the present notation). The main insight for making this estimation possible is to set up the fully coupled regular system of equations for the two sets of offsets in Eq. (27) that allows for their simultaneous estimation together with the object positions and transmission offsets. This procedure can also be applied when only a calibration is desired and the object parameters are not of interest.

This simultaneous estimation of the sensor time offsets, the object positions, and the transmission time offsets cannot be achieved by considering the standard mathematical setup for performing the object localization. The present invention uses a system of equations that are extended by the right amount of redundant objects and are brought into the right structure. According to an embodiment of the present invention the composition of the dependency matrices in Eq. (27) is provided that result in a regular (i.e., solvable) system of equations. Equivalently, the matrices, in Eq. (25) have to have the right size and structure.

Thus, the present invention provides the right vector-matrix-structure that allows a separation of the two sets of offsets and allows achieving the so called observability of the desired variables, i.e., their solution based on the given measurements.

BRIEF DESCRIPTION OF THE SEVERAL VIEWS OF THE DRAWING

In the following, the invention is illustrated and explained with the help of examples and figures. The figures show.

DETAILED DESCRIPTION OF THE INVENTION

Figure 1:
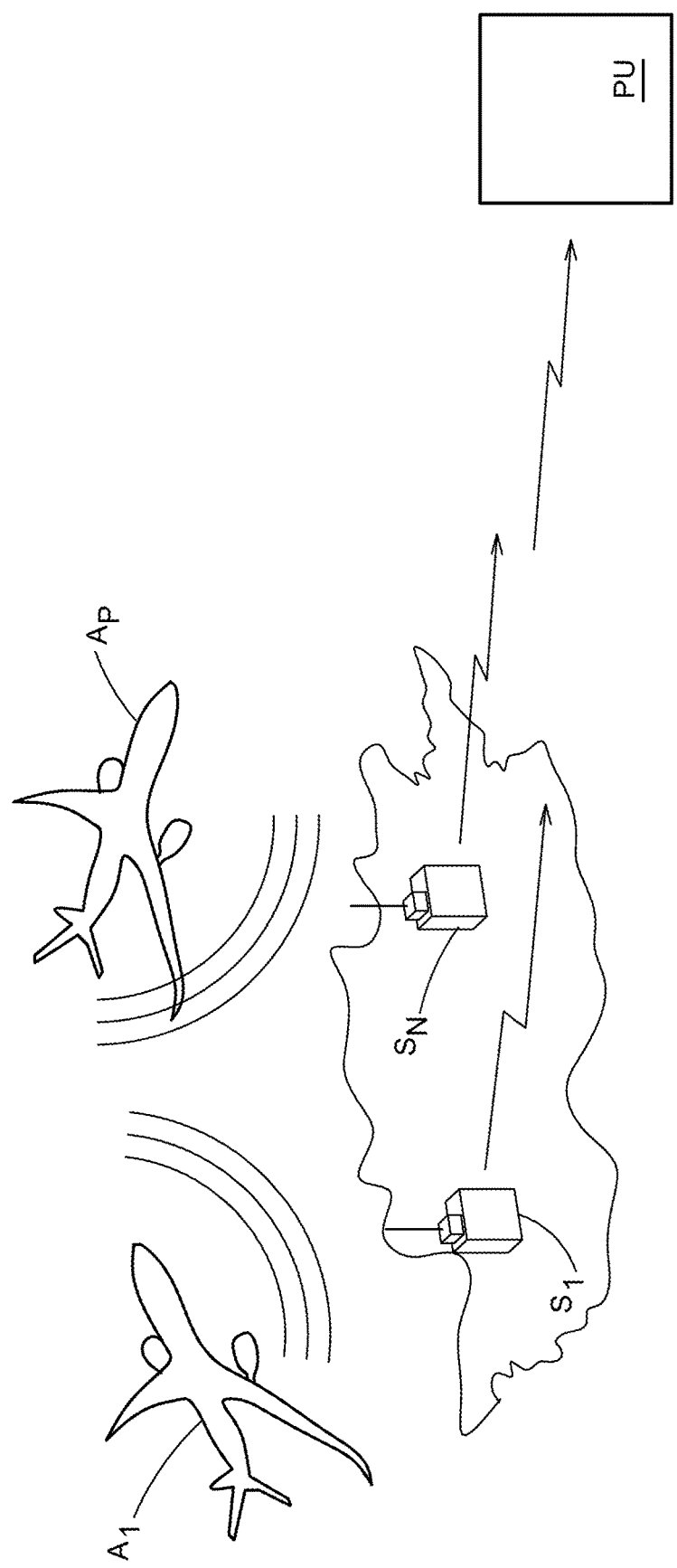
FIG. 1: Two aircraft emitting messages, which are received from different sensors.

The following notation will be used throughout the explanations given hereinafter:

k: time step
P: total number of objects to be tracked
N: total number of sensors
$z_k$: state at time step k
$x_k^j$: position of object j at time step k
$y_k^{i,j}$: measurement at sensor i, that comes from object j at time step k
$S^i$: position of sensor i
$v_k^{i,j}$, $w$: noise processes As illustrated in FIG. 1, in multilateration tracking, the positions of P objects, for example aircraft $A_1 \ldots A_P$, located at unknown positions $x_k^j$ for $j=1, \ldots, P$ have to be calculated at different time steps k. Several sensors $S_1 \ldots S_N$ located at known positions $S^i$ for $i=1, \ldots, N$ are measuring time events. A measured event, which stems from the object j, at sensor i at time step k is defined as $y_k^{i,j}$. The sensors are in communication with a processing unit PU which receives information from the sensor and produces output information according to techniques set forth below.

The relationship between the measured time event and the position of the objects is given by a non-linear measurement equation $$y_k^{i,j} = h^{i,j}(x_k^j, S^i, v_k^{i,j}), \qquad (6)$$

where the measured quantities are corrupted with noise $v_k^{i,j}$.

Furthermore, the dynamical behaviour of the system is described by a system equation $$z_{k+1} = a(z_k, w_k), \qquad (7)$$

where the state variable $z_k$ comprises the position of the objects and further state variables like velocity, etc.

In order to estimate the position of the objects, the Bayesian framework is used. It consists of the prediction and filter step. In the prediction step, the estimated density $f^e(z_k)$ of the previous filter step is propagated from time step k to (k+1) by means of the Chapman-Kolmogorov equation $$f^p(z_{k+1}) = \int f(z_{k+1}|z_k) \cdot f^e(z_k) dz_k, \qquad (8)$$

where $f(z_{k+1}|z_k)$ is the transition density defined by Eq. (7).

In the filter step, the current measurement value $\hat{y}_k$ is used for updating the result of the prediction step $f^p(z_k)$ according to Bayes' rule $$f^e(z_k) = c_k f(\hat{y}_k|z_k) \cdot f^p(z_k), \qquad (9)$$

where $c_k = 1/(\int f(\hat{y}_k|z_k) \cdot f^p(z_k) \cdot dz_k)$ is a normalization constant and $f(\hat{y}_k|z_k)$ is the likelihood defined by Eq. (6).

Figure 2:
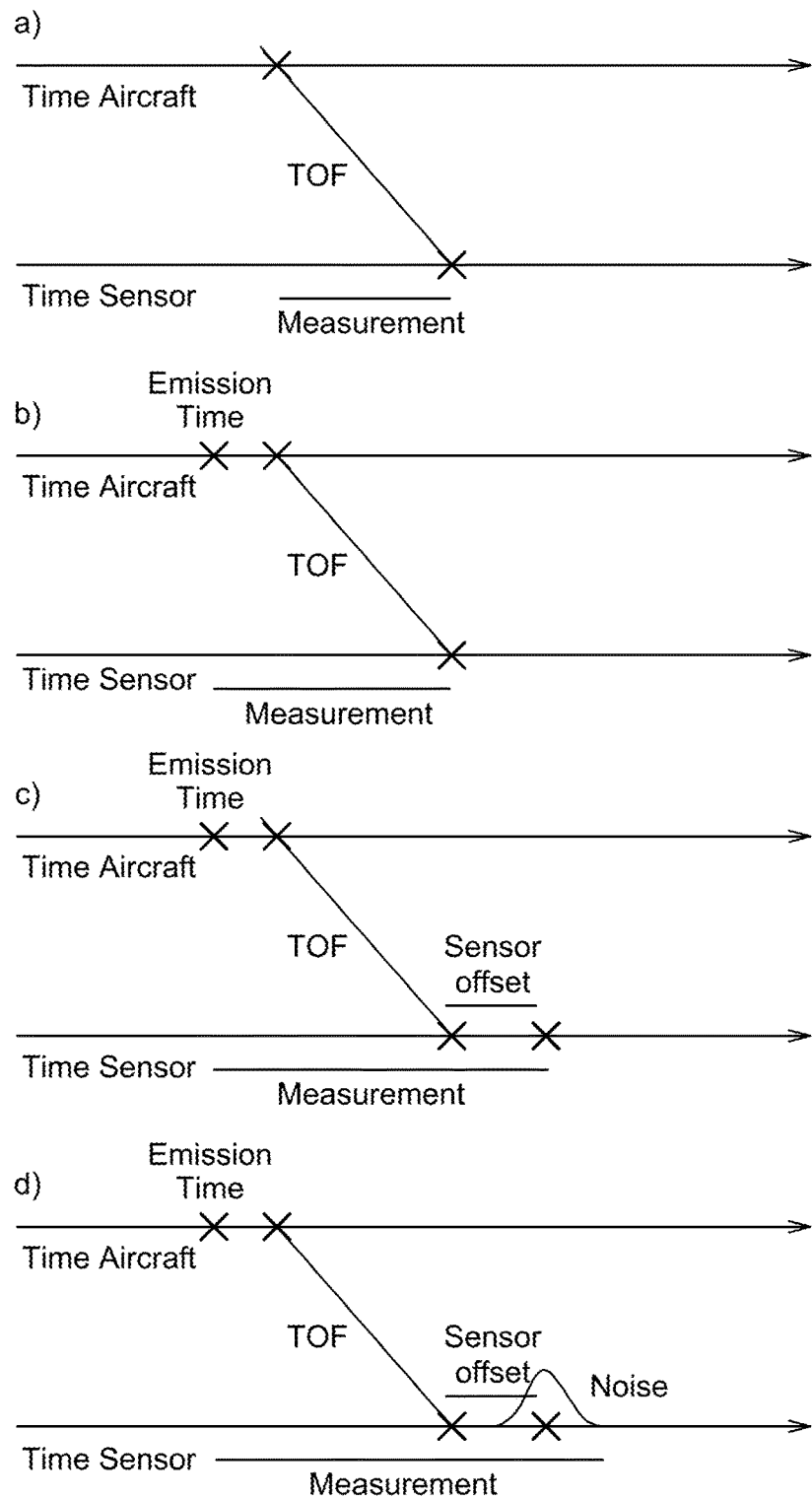
FIG. 2: The different measurement models. a) Time of flight; b) Time of flight and emission time; c) Time of flight, emission time and sensor offset; d) Time of flight, emission time, sensor offset and noise.

In order to derive a measurement model for the method for multilateration according to the invention, i.e., a method for multilateration in the case of unsynchronized sensor clocks, the different influences in the measurement process are described. First, only the time of arrival is considered, then this is extended to the case that the emission time is unknown. After that, the sensor offset and the influence of the noise are described. The four different models are shown in FIG. 2.

1) Time of Flight: The time of flight describes the travelling time of a signal from an object j to a sensor i. The relationship between the measured time of arrival $d_k^{i,j}$ and the unknown object position $x_k^j$ is then given by the Euclidean distance according to $$d_k^{i,j} = \frac{\|x_k^j - S^i\|_2}{c}, \qquad (10)$$

where c is the wave propagation speed and $\|\cdot\|_2$ is the $L_2$ norm.

2) Time of Flight+Unknown Emission Time: In the second scenario, the sensor cannot directly determine the travelling time due to the fact that the emission time of the object for a certain message is not known. This unknown emission time $b_k^j$ leads to an unknown offset $$y_k^{i,j} = d_k^{i,j} + b_k^j, \quad (11)$$

where this emission time is equal for all sensors for this certain message. In the following, the emission time is referred to as object offset.

3) Time of Flight+Unknown Emission Time+Sensor Offset: The third scenario is a situation, where in addition to the above described situation of scenario 2), also the sensor clocks are not synchronized to each other. Thus, every sensor has a sensor offset $o_k^j$ and this results in $$y_k^{i,j} = d_k^{i,j} + b_k^j + o_k^i. \quad (12)$$

This sensor offset is equal to all messages, which are measured at the same time.

4) Time of Flight+Unknown Emission Time+Sensor Offset+Noise: In a real scenario, disturbances occur. In order to cope with these uncertainties, a noise process $v_k^{i,j}$ is used, which leads to $$y_k^{i,j} = d_k^{i,j} + b_k^j + o_k^i + v_k^{i,j}. \quad (13)$$

In detail, Eq. (13) decomposes the individual receiving time into $d_k^{i,j}$, the spatial distance between the affected object and the affected sensor divided by the wave propagation speed, which results in the net travelling time, $b_k^j$, the offset corresponding to the unknown transmitting time in the object, $o_k^i$, the offset corresponding to the unknown receiving time—or equivalently the lack of lack of synchronization—in the sensor, $v_k^{i,j}$, zero-mean noise.

According to one aspect of the invention reference is just made to the offsets in the sensors as these are the ones to be estimated. The travelling times between sensors and objects is used for calculating the object positions simultaneously to the sensor offsets.

The system model describes the evolution of the state over time. In the following, the motion model for an aircraft and the system model for the sensor offset are discussed. Finally, a discussion for the aircraft offset is made.

1) Motion Models for Aircraft: Different types of motion models for aircraft can be applied, depending on the expected motion to be performed. In one embodiment, a standard motion model, the constant velocity model, is applied [7, 8]. The constant velocity model is described in state space as $$\begin{bmatrix} x_{k+1}^j \\ \dot{x}_{k+1}^j \end{bmatrix} = A^{x,\dot{x}} \cdot \begin{bmatrix} x_k^j \\ \dot{x}_k^j \end{bmatrix} + \underline{w}_k^{x,\dot{x}}, \quad (14)$$

where the system matrix is given by $$A^{x,\dot{x}} = \begin{bmatrix} I & T \cdot I \\ 0 & I \end{bmatrix}, \quad (15)$$

where T is the sampling time and $\dot{x}_k^j$ the velocity of the aircraft j.

The process noise $\underline{w}_k^{x,\dot{x}}$ is assumed as Gaussian distributed, with zero-mean and covariance matrix given by $$C^{x,\dot{x}} = \begin{bmatrix} \dfrac{T^3}{3} C^{\ddot{x}} & \dfrac{T^2}{2} C^{\ddot{x}} \\ \dfrac{T^2}{2} C^{\ddot{x}} & T C^{\ddot{x}} \end{bmatrix}. \quad (16)$$

The covariance matrix $C^{\ddot{x}}$ depends on the continuous time system model $$C^{\ddot{x}} = \mathrm{diag}([C^x C^y C^z]). \quad (17)$$

This is a specific object motion model, a so-called "constant velocity model", with generic noise parameters for the acceleration that is modelled as white noise. $C^x$, $C^y$, $C^z$ denote the spatial variances of the acceleration in a Cartesian space. For a concrete application, these values have to be determined based on practical considerations. Here reference can be made to Ref [8].

2) Sensor Offset Models: Due to the clock drift, the clock of each of several sensors drift apart and a sensor/clock offset $o_k^j$ of sensor i occurs. The clock offset is modelled as a continuous time process $$\dot{o}^i(t) = \rho^i(t), \quad (18)$$

where the $\rho^i(t)$ is modelled as a noise process with time characteristics of the drift, given by $$\dot{\rho}^i(t) = w^{\dot{o}}(t), \quad (19)$$

which leads to $$\ddot{o}^i(t) = w^{\dot{o}}(t). \quad (20)$$

After time discretisation the time discrete system model is given by $$\begin{bmatrix} o_{k+1}^i \\ \dot{o}_{k+1}^i \end{bmatrix} = A^{o,\dot{o}} \cdot \begin{bmatrix} o_k^i \\ \dot{o}_k^i \end{bmatrix} + \underline{w}_k^{o,\dot{o}}, \quad (21)$$

where the system matrix is given by $$A^{o,\dot{o}} = \begin{bmatrix} 1 & T \\ 0 & 1 \end{bmatrix} \quad (22)$$

and the process $\underline{w}_k^{o,\dot{o}}$ is assumed as Gaussian distributed, with covariance $$C^{o,\dot{o}} = \begin{bmatrix} \dfrac{T^3}{3} C^{\dot{o}} & \dfrac{T^2}{2} C^{\dot{o}} \\ \dfrac{T^2}{2} C^{\dot{o}} & T C^{\dot{o}} \end{bmatrix}. \quad (23)$$

$C^{\dot{o}}$ is the variance of the continuous time process.

3) Aircraft Offset Models: In the proposed approach it is assumed that the evolution of the emission time over time cannot be described by an adequate system model. The emission times are assumed as a noise process $b_k^j$ which is modelled later as a full correlated noise process in the measurement equation.

In the following, the resulting measurement equation and system equation for the method for multilateration according to the invention with unsynchronised clocks are shown for a complete message set. Furthermore, an inequality for one time step is given.

Based on Eq. (13), the resulting measurement equation for P aircraft and N sensors is given by $$\underline{y}_k = \underline{h}(\underline{x}_k^1, \ldots, \underline{x}_k^P) + H^b \cdot \underline{b}_k + H^o \cdot \underline{o}_k + \underline{v}_k \quad (24)$$

where $$H^b = I_P \otimes \underline{1}_N, \quad H^o = \underline{1}_P \otimes I_N. \quad (25)$$

⊗ stands for the Kronecker product. In the non-linear equation, the times of flight are listed according to $$\underline{h}(\underline{x}_k^1, \ldots, \underline{x}_k^P) = [d_k^{1,1} \ldots d_k^{N,1} \ldots d_k^{i,j} \ldots d_k^{N,P}]^T \quad (26)$$

Using Eqs. (25) and (26), Eq. (24) can also be written in the form $$\underline{y}_k = \quad (27)$$

$$\frac{1}{c}\begin{bmatrix} \|\underline{x}_k^1 - \underline{S}^1\| \\ \vdots \\ \|\underline{x}_k^1 - \underline{S}^N\| \\ \vdots \\ \|\underline{x}_k^P - \underline{S}^1\| \\ \vdots \\ \|\underline{x}_k^P - \underline{S}^N\| \end{bmatrix} + \begin{bmatrix} 1 & 0 & \cdots \\ \vdots & \vdots & \vdots \\ 1 & 0 & \cdots \\ & \ddots & \\ 0 & \cdots & 1 \\ \vdots & \vdots & \vdots \\ 0 & \cdots & 1 \end{bmatrix} \cdot \begin{bmatrix} b_k^1 \\ \vdots \\ b_k^P \end{bmatrix} + \begin{bmatrix} 1 & 0 & \cdots \\ & \ddots & \\ 0 & \cdots & 1 \\ \vdots & & \vdots \\ 1 & 0 & \cdots \\ & \ddots & \\ 0 & \cdots & 1 \end{bmatrix} \cdot \begin{bmatrix} o_k^1 \\ \vdots \\ o_k^N \end{bmatrix} + \underline{v}_k.$$

As described before, the emission time is considered as fully correlated noise due to the fact that no system model for the emission time can be assumed. In this case, the new noise process $\underline{v}_k^F$ in $$\underline{y}_k = \underline{h}(\underline{x}_k^1, \ldots, \underline{x}_k^P) + H^o \cdot \underline{o}_k + \underline{v}_k^F \quad (28)$$

consists of $$\underline{v}_k^F = H^b \cdot \underline{b}_k + \underline{v}_k. \quad (29)$$

The first two moments of noise process are then given by $$\underline{\mu}_k^{v^F} = H^b \cdot \underline{\mu}_k^b, \quad (30)$$
$$C_k^{v^F} = H^b \cdot C_k^b \cdot (H^b)^T + C_k^v.$$

The system state consists of the positions, the velocities, the sensor offsets, and the sensor drifts, according to $$\underline{z}_k = [(\underline{x}_k^1)^T (\dot{\underline{x}}_k^1)^T \ldots (o_k^1)^T (\dot{o}_k^1)^T \ldots ]^T. \quad (31)$$

The system equation can be modelled as a linear system equation based on Eqs. (14) and (21), given by $$\underline{z}_{k+1} = A \cdot \underline{z}_k + \underline{w}_k, \quad (32)$$

where the system matrix is given by $$A = \text{blkdiag}(A^{x,\dot{x}}, \ldots, A^{x,\dot{x}}, A^{o,\dot{o}}, \ldots, A^{o,\dot{o}}) \quad (33)$$

and the covariance of the process noise $$C^w = \text{blkdiag}(C^{x,\dot{x}}, \ldots, C^{x,\dot{x}}, C^{o,\dot{o}}, \ldots, C^{o,\dot{o}}). \quad (34)$$

If P aircraft are emitting signals, which are received by N sensors, N·P possible measurements can be used for one time step. The measurement equation consists of N+P·(D+1) unknown variables, where D is the considered dimension, in general D=3. A unique solution can be given if the condition N·P≥N+P·(D+1) is fulfilled.

For estimation, a Gaussian assumed density filter [9] is used, where the involved densities are described by the first two moments. Due to the linear motion model, Eq. (8) can be solved with the Kálmán predictor equation. However, due to the non-linear measurement equation, Eq. (9) cannot be solved directly. In order to solve the filter step, it is assumed that state and measurement are jointly Gaussian distributed.

Due to the non-linear measurement equation, a Gaussian assumed density filter is used. The filter step is solved based on the first two moments and it is assumed that the measurement and state are jointly Gaussian distributed. For a given measurement $\hat{\underline{y}}_k$, the conditional Gaussian is given by $$\underline{\mu}_k^e = \underline{\mu}_k^p + C_k^{z,y} \cdot (C_k^y)^{-1} \cdot (\hat{\underline{y}}_k - (\underline{\mu}_k^y + H^b \cdot \underline{\mu}_k^b)), \quad (35)$$
$$C_k^e = C_k^p - C_k^{z,y} \cdot (c_k^y)^{-1} \cdot (C_k^{z,y})^T,$$

where $\underline{\mu}_k^p$ and $C_k^p$ are the predicted mean and covariance. In order to calculate the estimated mean $\underline{\mu}_k^e$ and covariance $C_k^e$, the three unknown moments, i.e., the cross-covariance between state and measurement $C_k^{z,y}$, the covariance of the measurement process $C_k^y$, and the predicted measurement $\underline{\mu}_k^y$ have to be calculated. It should be noted that for the calculation of the predicted measurement $\underline{\mu}_k^y$ the values of the aircraft offsets are not considered. The values for the aircraft offsets are determined in a separate step, which will be explained below.

In the method for multilateration according to the invention, decomposition methods as proposed in Ref [10] are applied in order to reduce the mathematical effort. When using these decomposition methods in conditional linear models, it is possible to approximate the above outlined calculations, i.e., in particular the calculation of the expressions of Eqs. (35), with regard to the positions by a sample-based approach. The sample points are propagated through the measurement equation in Eq. (28). These sample points and the decomposed part are then used in order to calculate the mean and the covariance of the measurement process, as well as the cross-covariance between state and measurement.

Until now the aircraft offset is still unknown. In order to determine the aircraft offset, the Mahalanobis distance of the measurement density is used. For any time step k, the Mahalanobis distance can be expressed by a function of the mean value $\underline{\mu}_k^b$ of the aircraft offset $\underline{b}_k$. Then, the minimum of the Mahalanobis distance corresponds to the best estimation value for the aircraft offset. In order to find the best estimation value for the aircraft offset, the derivation of the Mahalanobis with respect to the mean value of the aircraft offset is taken, $$\frac{d}{d\underline{\mu}_k^b}(\hat{\underline{y}}_k - (\underline{\mu}_k^y + H^b \cdot \underline{\mu}_k^b))^T \cdot (C_k^y)^{-1} \cdot (\hat{\underline{y}}_k - (\underline{\mu}_k^y + H^b \cdot \underline{\mu}_k^b)) = 0, \quad (36)$$

which leads to $$-2(H^b)^T \cdot (C_k^y)^{-1} \cdot (\hat{\underline{y}}_k - (\underline{\mu}_k^y + H^b \cdot \underline{\mu}_k^b)) = 0. \quad (37)$$

The aircraft offset is then calculated by $$\underline{\mu}_k^b = \left((H^b)^T (C_k^y)^{-1} H^b\right)^{-1} (H^b)^T (C_k^y)^{-1} \left(\hat{\underline{y}}_k - \underline{\mu}_k^y\right) \quad (38)$$

and then used in Eq. (35).

Due to the linear models in Eq. (32), the Kálmán predictor equations are used, which are given by $$\underline{\mu}_k^p = A \cdot \underline{\mu}_k^e,$$

$$C_k^p = A \cdot C_k^e \cdot (A)^T + C^w. \quad (39)$$

Figure 5:
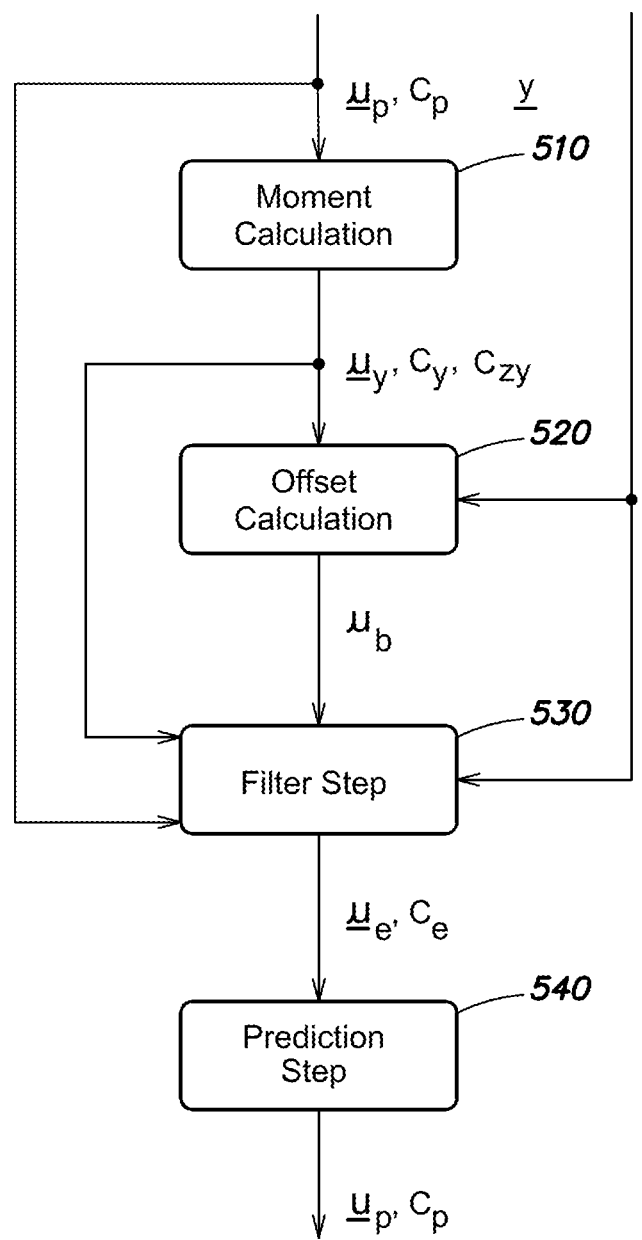
FIG. 5: Flowchart of one embodiment of the method.

With reference to FIG. 5, the method can be sketched as follows. At step 510, for an arbitrary time step, with the predicted density of the state described by its two first moments, i.e., the expectation value $\mu_P$ and the covariance matrix $C_P$, the predicted measurement $\mu_y$, the covariance of the measurement process $C_y$, and the cross-covariance between the state and the measurement $C_{z,y}$, are calculated. Then, at step 520, the calculated quantities are used to obtain an estimation for the aircraft offset $\mu_b$ according to Eq. (38). Next, at step 530, in the filter step, the estimated density of the state described by its expectation value $\mu_e$ and $C_e$ is calculated according to Eq. (35) using the results from the previous steps. Then, at step 540, according to the Kálmán predictor equations (39), the expressions $\mu_e$ and $C_e$ are used to calculate the predicted density of the state for the next time step, which is again given by the expectation value $\mu_P$ and the covariance matrix $C_P$.

Embodiments of the invention may also comprise a feature that allows for an improvement of the accuracy of the method for multilateration. This optional feature is related to the implementation of the method for multilateration and will be discussed in the following. The estimation is performed in a Cartesian coordinate system. Due to the fact that the aircraft is moving on a certain barometric height, this leads to the fact that the aircraft moves in a certain Cartesian space on a plane. In order to reduce dependencies for the component in the z axis, a transformation can be used. It is assumed that the certain area lies at latitude $\alpha$ and longitude $\beta$, and so a rotation matrix is given by $$R = \begin{bmatrix} \cos(\alpha) & 0 & -\sin(\alpha) \\ 0 & 1 & 0 \\ \sin(\alpha) & 0 & \cos(\alpha) \end{bmatrix} \begin{bmatrix} 1 & 0 & 0 \\ 0 & \cos(\beta) & -\sin(\beta) \\ 0 & \sin(\beta) & \cos(\beta) \end{bmatrix}. \quad (40)$$

The sensor positions are rotated, in such a way, that the dependencies in the z axis are removed according to $$R \cdot \underline{S}^i. \quad (41)$$

In order to reduce the dynamics in the measurement values for the j'th aircraft, the minimal value can be subtracted from the message set $$\underline{y}_k^{1 \ldots N,j} = [y_k^{ij} \ldots y_k^{N,j}]^T \quad (42)$$

coming from the j'th aircraft, and to reduce the dynamic in the aircraft offset for the j'th aircraft, a possible distance can be added according to $$\underline{y}_k^{1 \ldots N,j} - \min(\underline{y}_k^{1 \ldots N,j}) + d_k^{argmin(\underline{y}_k^{1 \ldots N,j}),j}. \quad (43)$$

For the proposed estimator it is useful to have a certain number of measurements over time. If the drift is slowly varying, the message sets from different aircraft can be collected over some short time horizon.

According to the embodiments of the invention described above, the method for multilateration has been evaluated with simulated and real data. In the simulation, the method of the invention is compared to the case, when the sensors are accurately synchronized. In the experiment, the estimated positions are compared to the ADS-B position of the aircraft.

In the simulation, the method according to the invention is compared to the case when the sensor offset is perfectly known, where both algorithms make use of a state estimator (Gaussian assumed density filter-GADF) and in the latter one the sensor offset is omitted from the state space. For the simulation, 8 sensors are placed according to Ref [11] so as to measure the receiving times of messages from different aircraft. The number of aircraft was selected to 10 and 30, respectively. The measured receiving times comprise the time of flight, an aircraft and sensor offset. Furthermore, the receiving times are corrupted with Gaussian noise varying from zero to 0.1 km. The simulation time is 360 seconds, with a sampling time of 0.1 seconds.

Figure 3A:
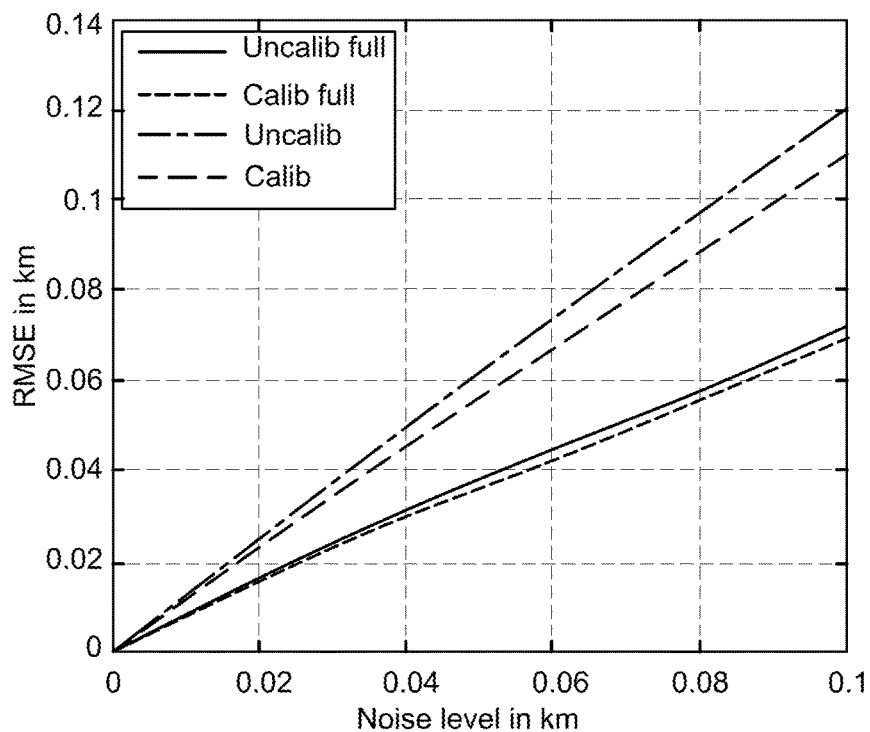
FIGS. 3 (a) and (b): The RMSE for 30 and 10 aircraft at different noise level. The dashed lines (short dashes and long dashes) show the results for calibrated data, in the case when at every time step all or only parts of the measurements are available, respectively. The solid line and the dash-dotted line show the results for uncalibrated data, in the case when at every time step all or only parts of the measurements are available, respectively.

Furthermore, the algorithms are compared between full measurement, i.e., all sensors received data from all aircraft at every time step, to part measurements, i.e., only a part of the possible measurement are measured. In FIG. 3(a), the root-mean-square error (RMSE) for all aircraft (30 aircraft) are shown for the case of calibrated and uncalibrated data, as well for full and part measurements. The ground truth corresponds to when the sensor offset is perfectly known. For uncalibrated data and full measurement, the method according to the invention has a higher RMSE than the ground truth, when the noise level increases. This deviation increases, when only part measurements are taken.

Figure 3B:
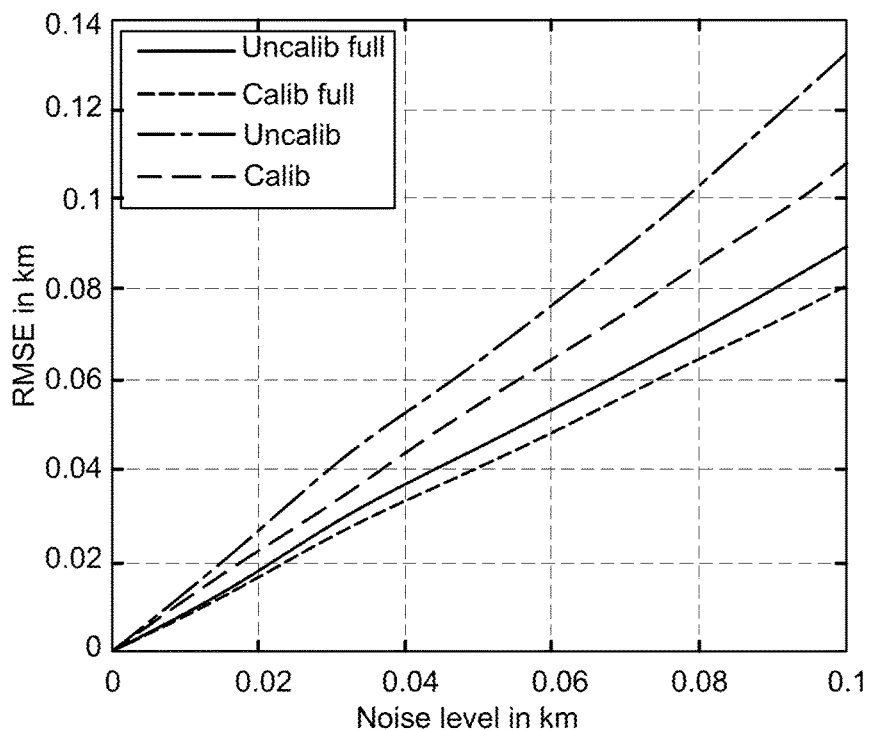

If the number of aircraft is decreased to 10, the accuracy for the method according to the invention compared to calibrated clocks is decreased as shown in FIG. 3(b). This can be explained by the fact that less aircraft serve for synchronization.

Figure 4:
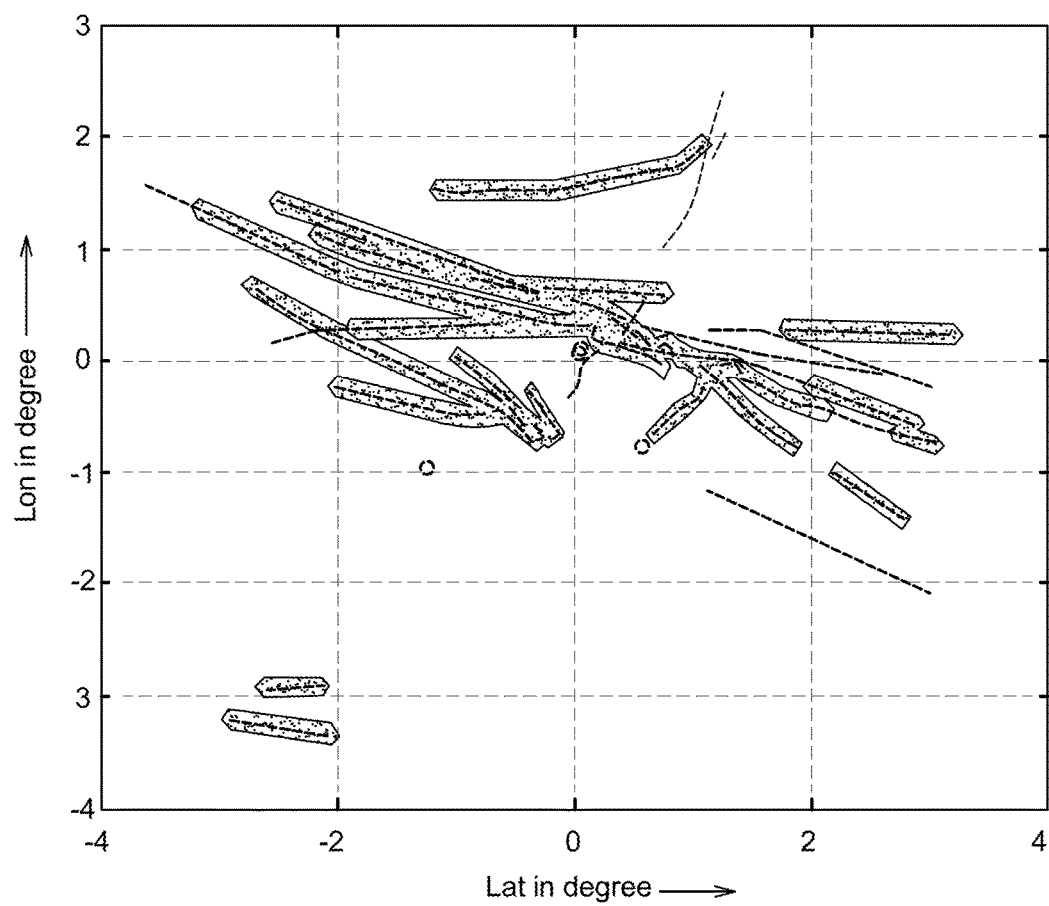
FIG. 4: Experimental results: Plot for Latitude and Longitude. The thin light lines are the estimated trajectory of the aircraft. The thick black lines are the ADS-B (Automatic Dependent Surveillance Broadcast) data from the aircraft.

In the real world experiment, uncalibrated data was used in order to estimate the trajectory of the aircraft. The proposed approach was compared to the ADS-B data from the aircraft. The whole dataset contains a recording about 13 minutes. In the evaluation, data over a 0.1 second horizon are collected to a data set for every measurement step. Furthermore, preferably a validation gate is used in order to cope with outliers. Outliers can cause poor estimates for the localization and synchronisation procedure. The validation gate is used for checking the result of the calculation before updating the estimated state of the system. More specifically, in order to detect outliers, the predicted measurement is compared to actual measurement depending on a given uncertainty. In FIG. 4 the results for the proposed approach and the ADS-B-data are shown.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

Furthermore, in the claims the word "comprising" does not exclude other elements or steps, and the indefinite article "a" or "an" does not exclude a plurality. A single unit may fulfil the functions of several features recited in the claims. The terms "essentially", "about", "approximately" and the like in connection with an attribute or a value particularly also define exactly the attribute or exactly the value, respectively. Any reference signs in the claims should not be construed as limiting the scope.

REFERENCES

[1] J. O. Smith and J. S. Abel, "Closed-Form Least-Squares Source Location Estimation from Range-Difference Measurements," *IEEE Transactions of Acoustics, Speech, and Signal Processing*, vol. ASSP-35, no. 12, pp. 1661-1669, December 1987.
[2] Y. Chan and K. Ho, "A Simple and Efficient Estimator for Hyperbolic Location," *IEEE Transactions on Signal Processing*, vol. 42, no. 8, pp. 1905-1915, August 1994.
[3] F. Fletcher, B. Ristic, and D. Musicki, "Recursive Estimation of Emitter Location using TDOA Measurements from two UAVs," in *Proceedings of the 10th International Conference on Information Fusion (Fusion 2007)*, Quebec, Canada, July 2007, pp. 1-8.
[4] S. Bancroft, "An Algebraic Solution of the GPS Equations," *IEEE Transactions on Aerospace and Electronic Systems*, vol. AES-21, no. 1, pp. 56-59, January 1985.
[5] F. Beutler and U. D. Hanebeck, "A Two-Step Approach for Offset and Position Estimation from Pseudo-Ranges Applied to Multilateration Tracking," in *Proceedings of the 13th International Conference on Information Fusion (Fusion 2010)*, Edinburgh, United Kingdom, July 2010, pp. 1-8.
[6] P. Dunau, F. Packi, F. Beutler, and U. D. Hanebeck, "Efficient Multilateration Tracking System with Concurrent Offset Estimation using Stochastic Filtering Techniques," in *Proceedings of the 13th International Conference on Information Fusion (Fusion 2010)*, Edinburgh, United Kingdom, July 2010, pp. 1-8.
[7] G. Welch, B. D. Allen, A. Ilie, and G. Bishop, "Measurement Sample Time Optimization for Human Motion Tracking/Capture Systems," in *Proceedings of Trends and Issues in Tracking for Virtual Environments, Workshop at the IEEE Virtual Reality 2007 Conference*, Charlotte, N.C., March 2007.
[8] Y. Bar-Shalom, X. R. Li, and T. Kirubarajan, *Estimation with Applications to Tracking and Navigation: Theory, Algorithms and Software*. John Wiley & Sons, Inc., 2001.
[9] K. Ito and K. Xiong, "Gaussian Filters for Nonlinear Filtering Problems," *IEEE Transactions on Automatic Control*, vol. 45, no. 5, pp. 910-927, May 2000.
[10] F. Beutler, M. F. Huber, and U. D. Hanebeck, "Gaussian Filtering using State Decomposition Methods," in *Proceedings of the 12th International Conference on Information Fusion (Fusion 2009)*, Seattle, Wash., July 2009, pp. 1-8.
[11] J. Isaacs, D. Klein, and J. Hespanha, "Optimal Sensor Placement for Time Difference of Arrival Localization," in *Proceedings of the 48th IEEE Conference on Decision and Control, 2009 held jointly with the 2009 28th Chinese Control Conference (CDC/CCC 2009)*, Shanghai, China, December 2009, pp. 7878-7884.

The invention claimed is:
1. A processing unit apparatus for use in a system for multilateration of at least one of a plurality of P objects, each of the plurality of P objects having a transmitter device, and each of the transmitter devices being configured to transmit a respective signal, each of a plurality of N sensors adapted to receive the transmitted signals from each of the objects and to measure respective receive times of each of the signals, the processing unit apparatus adapted to be operatively coupled to the plurality of sensors and to perform steps comprising:
  A. combining the receive times for the signals into a chronologically ordered series of message sets, wherein each of the message sets comprises the receive times of one of the transmitted signals as determined by each sensor;
  B. collecting all valid message sets that occur within a predetermined time interval $\Delta T_k$, wherein the index $k \in \{1, \ldots, N_{AT}\}$ denotes a time step, and wherein each valid message set contains receive times from at least N sensors;
  C. estimating a time offset vector $\underline{o}_k$ comprising time offsets $o_k^i$ of the receive times of the N sensors at time step k and $i \in \{1, \ldots, N\}$ by processing at least one of the message sets; and
  D. outputting a position of said at least one of the plurality of objects.

2. The apparatus of claim 1, wherein the step of estimating comprises:
  a prediction step that is performed according to a Chapman-Kolmogorov equation; and
  a filter step that is performed using Bayes' rule.

3. The apparatus of claim 2, wherein an emission time vector $\underline{b}_k$ is at least one of (i) modelled as a full-correlated noise process and (ii) estimated by using a distance expression depending on an expectation value of $\underline{b}_k$, wherein $\underline{b}_k$ comprises emission times $b_k^j$ of each of the P objects at time step k, wherein $j \in \{1, \ldots, P\}$.

4. The apparatus of claim 2, wherein the filter step is performed in accordance with a measurement equation $$\underline{y}_k = \underline{h}(\underline{x}_k, \underline{S}, \underline{b}_k, \underline{o}_k, \underline{v}_k),$$

that, for any time step k, describes a relation between a message set $\underline{y}_k$, and wherein $\underline{h}$ is a function depending on:
  an object position vector $\underline{x}_k$ at time step k, comprising positions $\underline{x}_k^j$ of each of the P objects at time step k, wherein $j \in \{1, \ldots, P\}$;
  a sensor position vector $\underline{S}$ comprising positions $\underline{S}^i$ of the N sensors, wherein $i \in \{1, \ldots, N\}$;
  the time offset vector $\underline{o}_k$;
  a general noise vector $\underline{v}_k$ comprising general noises $v_k^{i,j}$ at time step k.

5. The apparatus of claim 4, wherein the measurement equation is given by $$\underline{y}_k = \underline{h}(\underline{x}_k^1, \ldots, \underline{x}_k^P) + H^b \cdot \underline{b}_k + H^o \cdot \underline{o}_k + \underline{v}_k$$

with $$H^b = I_P \otimes \underline{1}_N, \quad H^o = \underline{1}_P \otimes I_N.$$

6. The apparatus of claim 2, wherein the prediction step is performed in accordance with a model for describing the time evolution of states, the time is described by a series of discrete time steps $k \in \{1, \ldots, N_{AT}\}$, wherein for each of the time steps $k \in \{1, \ldots, N_{AT}\}$ the state is given by a vector $\underline{z}_k$ comprising:
  the object position vector $\underline{x}_k$;
  an object velocity vector $\underline{\dot{x}}_k$ comprising the velocity of each of the objects;
  the sensor offset vector $\underline{o}_k$;
  a sensor drift vector $\underline{\dot{o}}_k$ comprising the drift of each of the sensor offsets;
and wherein the model comprises a recursive system equation $$\underline{z}_{k+1} = \underline{a}(\underline{z}_k, \underline{w}_k),$$

wherein $\underline{a}$ is a function depending on the state at time step k and $\underline{w}_k$ denotes a noise process over the time steps $k \in \{1, \ldots, N_{\Delta T}\}$.

7. The apparatus of claim 6, wherein the function $\underline{a}$ is a linear, affine function, of the state $\underline{z}_k$ and the noise $\underline{w}_k$.

8. The apparatus of claim 3, wherein the noise process is modelled as a Gaussian distributed process.

9. The apparatus of claim 2, wherein the prediction step is performed using the Kálmán predictor equations.

10. The apparatus of claim 6, wherein:
the receive times and the states are jointly Gaussian distributed; and
an estimated density of the states is described by an expectation value and a covariance.

11. The apparatus of claim 2, wherein a dependency for a component of a height of one of the plurality of objects is reduced by applying a rotation operator on coordinates of positions of the sensors.

12. The apparatus of claim 11, wherein dynamics in values for the j'th objects are reduced by subtracting a minimal value of the message set from each of the components of the measurement vector $\underline{y}_k$, and by adding, to the result thereof, an expected distance of the j'th object, where $j \in \{1, \ldots, P\}$.

13. The apparatus of claim 1, wherein
the N sensors are located at known positions ($\underline{S}^1, \ldots \underline{S}^N$), respectively;
the transmitter devices in the objects are at unknown positions ($\underline{x}_k^1, \ldots, \underline{x}_k^P$), respectively,
the transmitter device of each of the objects transmits signals at unknown times of transmissions;
the steps further comprising
providing a measurement equation for the P objects and the N sensors of $$\underline{y}_k = \frac{1}{c} \begin{bmatrix} \|\underline{x}_k^1 - \underline{S}^1\| \\ \vdots \\ \|\underline{x}_k^1 - \underline{S}^N\| \\ \vdots \\ \|\underline{x}_k^P - \underline{S}^1\| \\ \vdots \\ \|\underline{x}_k^P - \underline{S}^N\| \end{bmatrix} + \begin{bmatrix} 1 & 0 & \cdots \\ \vdots & \vdots & \vdots \\ 1 & 0 & \cdots \\ & \ddots & \\ 0 & \cdots & 1 \\ \vdots & \vdots & \vdots \\ 0 & \cdots & 1 \end{bmatrix} \cdot \begin{bmatrix} b_k^1 \\ \vdots \\ b_k^P \end{bmatrix} + \begin{bmatrix} 1 & 0 & \cdots \\ & \ddots & \\ 0 & \cdots & 1 \\ \vdots & & \vdots \\ 1 & 0 & \cdots \\ & \ddots & \\ 0 & \cdots & 1 \end{bmatrix} \cdot \begin{bmatrix} o_k^1 \\ \vdots \\ o_k^N \end{bmatrix} + \underline{v}_k$$

that, for any time step k, describes a relation between a message set $\underline{y}_k$, and wherein $\underline{y}_k$ is depends on:
c, which is the propagation speed of the transmitted signals in the considered medium;
an object position vector $\underline{x}_k$ at a time step k, comprising the positions $\underline{x}_k^j$ of each of the P objects at time step k;
a sensor position vector $\underline{S}$ comprising the positions $\underline{S}^i$ of each of the N sensors, wherein $\|\cdot\|$ is the standard Euclidian norm;
the time offset vector $\underline{o}_k$, wherein $\underline{o}_k = (o_k^1, \ldots, o_k^N)$;
a general noise vector $\underline{v}_k$ comprising general noises $v_k^{i,j}$ at time step k, wherein each of the sensors is identified by an index i and each of the objects is identified by index j and the receive times are identified by the index $y_k^{i,j}$;
wherein the numbers of N sensors and P objects fulfil the following condition:
N·P≥N+P·(D+1); and, where D is the considered dimension; and
wherein the transmission time vector is designated by $b_k$ comprising the transmission times $b_k^j$ of each of the P objects at time step k;
the calculated object positions are identified by $x_k^1, \ldots, x_x^P$.

14. The apparatus of claim 13, wherein transmission time vector $\underline{b}_k$ is multiplied with a matrix $H^b$ and the resulting term is modelled as a fully correlated noise process by using a distance expression depending on an expectation value of $\underline{b}_k$, where
$H^b = I_P \otimes \underline{1}_N, H^o = \underline{1}_P \otimes I_N$.

15. A method for multilateration of at least one of a plurality of P objects, each of the plurality of P objects having a transmitter device, and each of the transmitter devices being configured to transmit a respective signal, the method using a plurality of N sensors,
each sensor adapted to receive the transmitted signals from each of the objects and to determine respective receive times of each of the signals, the method comprising:
A. combining the receive times for the signals into a chronologically ordered series of message sets, wherein each of the message sets comprises the receive times of a single transmitted signal as determined by each sensor;
B. collecting all valid message sets that occur within a predetermined time interval $\Delta T_k$, wherein the index $k \in \{1, \ldots, N_{\Delta T}\}$ denotes a time step, and wherein a valid message set contains receive times from at least N sensors;
C. estimating a time offset vector $\underline{o}_k$ comprising time offsets $o_k^i$ of the receive times of the N sensors at time step k and $i \in \{1, \ldots, N\}$ by processing at least one of the message sets; and
D. outputting the position of said at least one of the plurality of objects.

\* \* \* \* \*

UNITED STATES PATENT AND TRADEMARK OFFICE
CERTIFICATE OF CORRECTION

PATENT NO. : 9,664,770 B2  
APPLICATION NO. : 14/465212  
DATED : May 30, 2017  
INVENTOR(S) : Frederik Beutler et al.

Page 1 of 1

It is certified that error appears in the above-identified patent and that said Letters Patent is hereby corrected as shown below:

On the Title Page

Column 1, item (71) Applicants: delete "Karlsruher Institut Feur Technologie, Karlsruhe (DE); COMSOFT GmbH, Karlsruhe (DE)" and insert --Comsoft Solutions GmbH, Karlsruhe (DE)--

Signed and Sealed this  
Seventeenth Day of October, 2017

Joseph Matal  
*Performing the Functions and Duties of the*  
*Under Secretary of Commerce for Intellectual Property and*  
*Director of the United States Patent and Trademark Office*